(12) United States Patent
Fujimura et al.

(10) Patent No.: US 8,178,635 B2
(45) Date of Patent: May 15, 2012

(54) α-OLEFIN POLYMER AND PROCESS FOR PRODUCTION THEREOF

(75) Inventors: Takenori Fujimura, Ichihara (JP); Masami Kanamaru, Ichihara (JP); Yutaka Minami, Ichihara (JP); Takuji Okamoto, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 459 days.

(21) Appl. No.: 12/526,978

(22) PCT Filed: Feb. 18, 2008

(86) PCT No.: PCT/JP2008/052662
§ 371 (c)(1),
(2), (4) Date: Aug. 13, 2009

(87) PCT Pub. No.: WO2008/102729
PCT Pub. Date: Aug. 28, 2008

(65) Prior Publication Data
US 2010/0036066 A1    Feb. 11, 2010

(30) Foreign Application Priority Data
Feb. 19, 2007   (JP) ................................. 2007-038044

(51) Int. Cl.
C08F 4/64     (2006.01)
C08F 4/76     (2006.01)
C08F 10/14    (2006.01)
C08F 10/00    (2006.01)

(52) U.S. Cl. .................. 526/160; 526/348.3; 526/170; 526/943; 526/941; 526/348; 526/904

(58) Field of Classification Search ............... 526/348.3, 526/160, 170
See application file for complete search history.

(56) References Cited

U.S. PATENT DOCUMENTS

| | | | |
|---|---|---|---|
| 7,019,091 B2 * | 3/2006 | Minami et al. ................. | 526/160 |
| 7,109,283 B2 * | 9/2006 | Minami et al. ................. | 526/348.3 |
| 7,214,755 B2 * | 5/2007 | Minami et al. ................. | 526/348.3 |
| 7,714,081 B2 * | 5/2010 | Sera et al. ..................... | 525/500 |
| 2002/0010290 A1 | 1/2002 | Minami et al. | |
| 2005/0049373 A1 | 3/2005 | Minami et al. | |
| 2005/0119374 A1 | 6/2005 | Minami et al. | |
| 2007/0073021 A1 | 3/2007 | Aburatani et al. | |
| 2007/0161502 A1 | 7/2007 | Okamoto et al. | |
| 2009/0082532 A1 * | 3/2009 | Fujimura et al. ............. | 526/127 |
| 2009/0240016 A1 * | 9/2009 | Fujimura et al. ............. | 526/348 |

FOREIGN PATENT DOCUMENTS

| | | |
|---|---|---|
| EP | 1 006 097 | 6/2000 |
| EP | 1 164 146 A2 | 12/2001 |
| EP | 1 477 500 A1 | 11/2004 |
| EP | 1 674 483 A1 | 6/2006 |
| EP | 1 961 776 A1 | 8/2008 |
| JP | 3 100004 | 4/1991 |
| JP | 5 222120 | 8/1993 |
| JP | 6 293805 | 10/1994 |
| JP | 7 507352 | 8/1995 |
| JP | 2000 159832 | 6/2000 |
| JP | 2001 335607 | 12/2001 |
| JP | 2005 75908 | 3/2005 |
| WO | 93 24539 | 12/1993 |
| WO | 03 070790 | 8/2003 |
| WO | WO 2005/040300 A1 * | 5/2005 |
| WO | 2005 073242 | 8/2005 |
| WO | WO 2006/135009 A1 * | 12/2006 |
| WO | WO 2007/063885 A1 * | 6/2007 |

* cited by examiner

*Primary Examiner* — Rip A. Lee
(74) *Attorney, Agent, or Firm* — Oblon, Spivak, McClelland, Maier & Neustadt, L.L.P.

(57) ABSTRACT

Provided is an α-olefin polymer having an excellent balance between a molecular weight and a melting point, which is a polymer of one or more kinds of α-olefins having 20 to 40 carbon atoms, and which meets the following requirements (1) to (4): (1) the α-olefin polymer has a molecular weight distribution (Mw/Mn) determined from its weight average molecular weight (Mw) and number average molecular weight (Mn) in terms of polystyrene measured by a GPC method of 2 or less, and has an Mw of 5,000 or less; (2) measurement of a melting point (Tm) of the α-olefin polymer with DSC shows one melting peak, a melting heat absorption (AH) calculated from an area of the melting peak is 20 J/g or more, and the melting peak has a half value width of 10° C. or less; (3) when the Mw falls within a range of 1,000 to 5,000 and an average number of carbon atoms (Cn) of the α-olefins falls within a range of 20 to 40, the Mw, the Cn, and the Tm measured with the DSC satisfy the relationship, $0.0025 \times Mw + (Cn \times 3.3812 - 29.5) \leq Tm \leq 0.0025 \times Mw + ((Cn+1) \times 3.3812 - 29.5)$; and (4) a stereoregularity index [$M_2$] derived from a chain of the α-olefins each having 20 to 40 carbon atoms is 20% by mol or more.

8 Claims, 1 Drawing Sheet

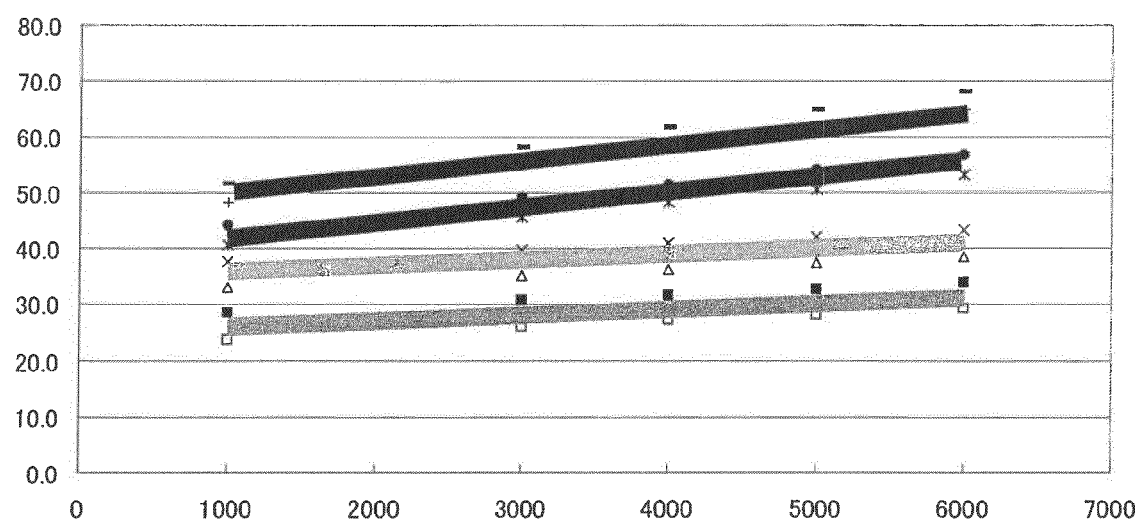

α-OLEFIN POLYMER AND PROCESS FOR PRODUCTION THEREOF

TECHNICAL FIELD

The present invention relates to a polymer of an α-olefin having 20 to 40 carbon atoms (a polymer of one kind of an α-olefin and a copolymer of two or more kinds of α-olefins are included in the category of the "polymer") and a process for the production of the polymer, and more specifically, to an α-olefin polymer obtained by polymerizing one or more kinds of α-olefins each having 20 to 40 carbon atoms as raw materials, having a weight average molecular weight (Mw) of 5,000 or less, and showing an excellent balance between a molecular weight and a melting point, and a process for the production of the polymer.

BACKGROUND ART

Hydrocarbon waxes have been finding use in various applications including ink, paints, emulsions, and releasing agents for toner. In addition, the hydrocarbon waxes may be used in applications except those described above, and examples of the applications include resin modifiers, components for tackiness agents, components for adhesives, components for lubricant oils, organic or inorganic composite materials, heat storage materials, modifiers for fuel oils such as a light fuel oil, modifiers for asphalt, high performance waxes, and cosmetics.

Various properties are requested of each of the hydrocarbon waxes to be used in those applications, and examples of the properties include: reduced tackiness and reduced bleedout; a moderately low melting point (20 to 80° C.); a moderate hardness; and excellent temperature response property. However, it has not been easy to meet levels desired for those properties simultaneously because each of the properties is susceptible to the molecular weight, molecular structure, and the like of each of the waxes.

For example, the melting point of a paraffin wax as one kind of the hydrocarbon waxes can be lowered to about 50° C. by adjusting the weight average molecular weight (Mw) of the paraffin wax to less than 1,000. However, the paraffin wax involves the following problem: the paraffin wax is soft, in other words, has a low hardness.

In addition, other kinds of the hydrocarbon waxes are, for example, polyolefin waxes. However, none of the polyolefin waxes has sufficient properties with reference to the properties requested in the above applications.

For example, Patent Document 1 discloses a process for the production of a polyolefin wax using a metallocene catalyst. However, a polypropylene wax described in an example of the document has a relatively high molecular weight, and hence has a high melting point. Patent Documents 2 and 3 each disclose a process for the production of an olefin oligomer by cationic polymerization. However, the molecular weight and stereoregularity of a polymer to be obtained are hard to control in the cationic polymerization, so the resultant polymer does not have such sharp melting property as to melt only at a specific melting point (excellent temperature response property), and the absence of such property is responsible for the tackiness or bleedout of the polymer. Patent Document 4 discloses a process for the production of a polyolefin wax using a specific metallocene catalyst. However, the polyolefin wax is a polymer produced mainly from ethylene or propylene and having a weight average molecular weight (Mw) of 1,000 or more, and hence has a high melting point. Patent Document 5 discloses a process for the production of a polyolefin using a metallocene catalyst. However, a 1-olefin having a relatively low molecular weight such as propylene or hexene is used in an example of the document, and the use of a polyolefin made of any such olefin as a wax may involve the following difficulty: it is difficult to solve problems concerning the tackiness and bleedout of the wax, and a problem concerning the melting point of the wax simultaneously. Patent Document 6 discloses an α-olefin polymer using an α-olefin having 18 carbon atoms as a raw material, and the polymer has the following preferable properties suitable for use as a wax: a weight average molecular weight (Mw) of 4,000 and a melting point of 39° C. However, the technique described in Patent Document 6 has not sufficed for the following object: the wax is improved in accordance with its applications so that specific property may be changed.

As described above, it has not been easy to meet various requested properties in a balanced manner, and at the same time, to change specific property freely in accordance with each application with any one of the conventional techniques concerning the hydrocarbon waxes, and hence additional technical development has been demanded.

Patent Document 1: JP 03-100004 A
Patent Document 2: JP 05-222120 A
Patent Document 3: JP 2000-159832 A
Patent Document 4: JP 06-293805 A
Patent Document 5: JP 07-507352 A
Patent Document 6: WO 05/073242

DISCLOSURE OF THE INVENTION

Problems to be Solved by the Invention

The present invention has been made in view of the above circumstances, and an object of the present invention is to provide an α-olefin polymer showing an excellent balance between a molecular weight and a melting point, that is, an α-olefin polymer being suitable as a wax or the like and having the following characteristics, and a process for efficient production of the polymer: even when the weight average molecular weight (Mw) of the polymer is 5,000 or less, the melting point of the polymer can be controlled to fall within the range of 10 to 90° C., and the polymer has such sharp melting property as to melt only at a specific melting point.

Means for Solving the Problems

The inventors of the present invention have made extensive studies, and as a result, have found the following: the weight average molecular weight of an α-olefin polymer can be adjusted to 5,000 or less by polymerizing an α-olefin having 20 to 40 carbon atoms with a specific catalyst system, and the adjustment of the molecular weight leads to controlling the melting point of the α-olefin polymer within the range of 10 to 90° C. That is, a conventionally synthesized α-olefin polymer having a weight average molecular weight of 5,000 or less inevitably has a melting point of 40° C. or lower, and the melting point is too low for the α-olefin polymer to find use in the above applications such as resin modifies. Accordingly, the α-olefin polymer may involve problems in terms of its bleedout property, tackiness property, and storage stability. In addition, as described in, for example, JP 2005-75908 A, the melting point of an α-olefin polymer has been conventionally controlled only on the basis of the number of carbon atoms of a monomer of which the polymer is formed. In contrast, the inventors of the present invention have found that the melting point of an α-olefin polymer can be controlled by polymerizing an α-olefin having 20 to 40 carbon atoms with a specific catalyst. The present invention has been completed on the basis of such finding.

That is, the present invention provides an α-olefin polymer and a process for the production of the polymer described below.

1. An α-olefin polymer of one or more kinds of α-olefins each having 20 to 40 carbon atoms, wherein the polymer meets the following requirements (1) to (4):

(1) the α-olefin polymer has a molecular weight distribution (Mw/Mn) determined from its weight average molecular weight (Mw) and number average molecular weight (Mn) in terms of polystyrene measured by gel permeation chromatography (GPC) of 2 or less, and has a weight average molecular weight (Mw) of 5,000 or less;

(2) measurement of a melting point (Tm) of the α-olefin polymer with a differential scanning calorimeter (DSC) shows one melting peak, a melting heat absorption (ΔH) calculated from an area of the melting peak is 20 J/g or more, and the melting peak has a half value width of 10° C. or less;

(3) when the weight average molecular weight (Mw) falls within a range of 1,000 to 5,000 and an average number of carbon atoms (Cn) of the α-olefins falls within a range of 20 to 40, the weight average molecular weight (Mw), the average number of carbon atoms (Cn), and the melting point (Tm) measured with the differential scanning calorimeter (DSC) satisfy the following relationship (a):

$$0.0025 \times Mw + (Cn \times 3.3812 - 29.5) \leq Tm \leq 0.0025 \times Mw + ((Cn+1) \times 3.3812 - 29.5) \quad (a); \text{ and}$$

(4) a stereoregularity index [M₂] derived from a chain of the α-olefins each having 20 to 40 carbon atoms is 20% by mol or more.

2. The α-olefin polymer according to the item 1, wherein the α-olefin polymer meets the following requirement (5):

(5) the α-olefin polymer has 0.5 to 1.0 vinylidene group as an unsaturated terminal group per molecule.

3. A process for production of the α-olefin polymer according to the item 1, comprising polymerizing α-olefins having 20 to 40 carbon atoms in the presence of a polymerization catalyst containing (A) a transition metal compound represented by the following general formula (1) and (B) at least one kind of a component selected from (B-1) a compound capable of reacting with the transition metal compound as the component (A) or a derivative of the compound to form an ionic complex and (B-2) an aluminoxane:

[Chem 1]

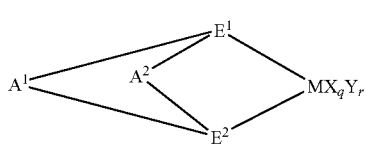

(1)

[in the formula, M represents a metal element belonging to any one of Groups 3 to 10 of the periodic table, X represents a σ-bonding ligand, and, when multiple X's are present, the multiple X's may be identical to or different from each other, Y represents a Lewis base, and, when multiple Y's are present, the multiple Y's may be identical to or different from each other, $A^1$ and $A^2$ each represent a crosslinking group, and a boron atom or a phosphorus atom serves as a crosslinking atom in at least one of $A^1$ and $A^2$, q represents an integer of 1 to 5 and corresponds to [(valence of M)–2], r represents an integer of 0 to 3, and $E^1$ and $E^2$ each have a structure represented by the following general formula (2) or (3):

[Chem 2]

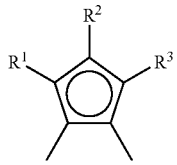

(2)

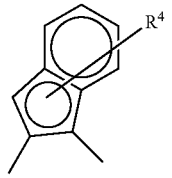

(3)

(in the formulae, $R^1$ to $R^3$ each independently represent a group selected from a hydrogen atom, a halogen atom, a hydrocarbon group having 1 to 20 carbon atoms, a halogen-containing hydrocarbon group having 1 to 4 carbon atoms, a silicon-containing group, and a heteroatom-containing group, and $R^4$ represents a hydrogen atom or a hydrocarbon group having 1 to 20 carbon atoms), and $E^1$ and $E^2$ may be different from or identical to each other].

4. The process for production of an α-olefin polymer according to the item 3, wherein the polymerization catalyst contains (C) an organoaluminum compound.

5. The process for production of an α-olefin according to the item 3, wherein the polymerization catalyst is obtained by contacting the component (A), the component (B), and an α-olefin having 3 to 24 carbon atoms in advance.

6. The process for production of an α-olefin according to the item 4, wherein the polymerization catalyst is obtained by contacting the component (A), the component (B), the component (C), and an α-olefin having 3 to 24 carbon atoms in advance.

Effect of the Invention

In addition, a high hardness is characteristic of the polymer. Accordingly, the polymer is useful in various applications typified by releasing agents for ink, paints, emulsions, and toner. A polymer to be used in those applications preferably has a melting point of 40 to 50° C. from the viewpoint of storage stability in the summer months; the present invention can provide an α-olefin polymer meeting such a request.

BRIEF DESCRIPTION OF THE DRAWING

FIG. 1 is a graph illustrating a relationship between the molecular weight and melting point of an α-olefin polymer.

BEST MODE FOR CARRYING OUT THE INVENTION

An α-olefin polymer of the present invention is a polymer of one or more kinds of α-olefins each having 20 to 40 carbon atoms. Examples of the α-olefins each having 20 to 40 carbon atoms include 1-icosene, 1-docosene, 1-hexacosene, 1-octacosene, 1-triacontene, 1-dotriacontene, 1-tetratriacontene, 1-hexatriacontene, 1-octatriacontene, and 1-tetracontene. In the present invention, one kind of those α-olefins may be used alone, or two or more kinds of them may be used in combination.

The α-olefin polymer of the present invention meets the following requirements (1) to (4).

(1) The α-olefin polymer has a molecular weight distribution (Mw/Mn) determined from its weight average molecular weight (Mw) and number average molecular weight (Mn) in terms of polystyrene measured by gel permeation chromatography (GPC) of 2 or less, and has a weight average molecular weight (Mw) of 5,000 or less.

When the weight average molecular weight (Mw) of the α-olefin polymer is 5,000 or less, the polymer can obtain flowability with which the polymer satisfactorily functions as a wax. The weight average molecular weight preferably falls within the range of 1,000 to 5,000. When the weight average molecular weight is 1,000 or more, the polymer has a nature by which the polymer is distinguished from a monomer as a liquid of which the polymer is formed.

In addition, when the molecular weight distribution is 2 or less, the surface property of the α-olefin polymer is improved, and the tackiness, and a reduction in strength, of the polymer are suppressed. The molecular weight distribution falls within the range of preferably 1.05 to 2.0, or more preferably 1.1 to 2.0.

It should be noted that the weight average molecular weight (Mw) and the molecular weight distribution (Mw/Mn) described above are a weight average molecular weight (Mw) in terms of polystyrene measured by gel permeation chromatography (GPC) with the following apparatus under the following conditions, and a value calculated from the weight average molecular weight (Mw) and a number average molecular weight (Mn).

GPC Measurement Apparatus:
Column: TOSO GMHHR-H(S)HT
Detector: RI detector for liquid chromatogram WATERS 150C
Measurement Conditions:
Solvent: 1,2,4-trichlorobenzene
Measurement temperature: 145° C.
Flow rate: 1.0 mL/min
Concentration of sample: 2.2 mg/mL
Injection amount: 160 μL
Calibration curve: Universal Calibration
Analysis program: HT-GPC (Ver. 1.0)

(2) The measurement of a melting point (Tm) of the α-olefin polymer with a differential scanning calorimeter (DSC) shows one melting peak, a melting heat absorption (ΔH) calculated from the area of the melting peak is 20 J/g or more, and the melting peak has a half value width of 10° C. or less.

The melting heat absorption (ΔH) is determined as described below. That is, a melting endothermic curve is obtained with a differential scanning calorimeter (DSC-7 manufactured by PerkinElmer Co., Ltd.) by retaining 10 mg of a sample under a nitrogen atmosphere at −10° C. for 5 minutes and increasing the temperature of the sample to 120° C. at 10° C./min. The peak top of the peak observed at the highest temperature of the curve is the melting point (Tm), and the melting heat absorption (ΔH) is calculated from the area of the melting peak obtained in the measurement of the melting point (Tm).

In the α-olefin polymer of the present invention, the ΔH falls within the range of preferably 20 to 250 J/g, or more preferably 30 to 200 J/g. The ΔH is an indication as to whether or not the polymer is soft; as the value increases, the polymer shows an increased elastic modulus and reduced softness.

The number of melting peaks observed during the heating process for measuring the above melting point (Tm) must be one. A state where the number of melting peaks is one means that no absorption regarded as any other peak or shoulder is present.

The term "half value width" refers to a peak width at the 50% height of the endothermic peak upon measurement of the melting point (Tm) with the DSC as described above; the smaller the half value width, the more uniform the crystal of the α-olefin polymer to be formed. Accordingly, the half value width is property showing the uniformity of the α-olefin polymer. The half value width falls within the range of preferably 9.5° C. or less, or more preferably 9 to 2° C. When the half value width is 10° C. or less, the α-olefin polymer shows sharp melting behavior. For example, when the α-olefin polymer of the present invention is used as a main material for a temperature-sensitive tackiness agent, the widening of a switching temperature range between tackiness and non-tackiness is suppressed, so a rapid change in tackiness force of the agent with temperature can be realized. That is, the temperature sensitivity of the agent is improved.

(3) When the weight average molecular weight (Mw) falls within the range of 1,000 to 5,000 and an average number of carbon atoms (Cn) of the α-olefins falls within the range of 20 to 40, the weight average molecular weight (Mw), the average number of carbon atoms (Cn), and the melting point (Tm) measured with the differential scanning calorimeter (DSC) satisfy the following relationship (a):

$$0.0025 \times Mw + (Cn \times 3.3812 - 29.5) \leq Tm \leq 0.0025 \times Mw + ((Cn+1) \times 3.3812 - 29.5) \quad \text{(a)}.$$

The above average number of carbon atoms preferably falls within the range of 20 to 32. It should be noted that the term "average number of carbon atoms" refers to an average number of carbon atoms calculated on the basis of the content of each α-olefin when two or more kinds of α-olefins are used as raw materials. When one kind of an α-olefin is used as a raw material, the above average number of carbon atoms refers to the number of carbon atoms of the α-olefin.

The inventors of the present invention have found that, when the weight average molecular weight (Mw) becomes 5,000 or less, the melting point starts to depend on the molecular weight, and drops with decreasing molecular weight. Further, there arises a difference in behavior between a polymer of an α-olefin having 18 or less carbon atoms and a polymer of an α-olefin having 20 or more carbon atoms; with regard to the difference, such results as illustrated in FIG. 1 were obtained. The graph illustrated in FIG. 1 illustrates a relationship between the molecular weight and melting point (° C.) of a polymer. In the graph, □ and ■ represent a lower limit and an upper limit for the melting point of a polymer of an α-olefin having 16 carbon atoms, Δ and × represent a lower limit and an upper limit for the melting point of a polymer of an α-olefin having 18 carbon atoms, * and ● represent a lower limit and an upper limit for the melting point of a polymer of an α-olefin having 20 carbon atoms, and + and − represent a lower limit and an upper limit for the melting point of a polymer of an α-olefin having 22 carbon atoms. The above relationship (a) is obtained from the results of measurement described in Examples. In the measurement, samples with various molecular weights were synthesized by adjusting a temperature and the amount of hydrogen as polymerization conditions, a relationship between the molecular weight and melting point behavior of each sample (gradient), and a relationship between the number of carbon atoms and melting point behavior of each sample (intercept) were calculated, and the relationship (a) was determined. In addition, the lower limit and upper limit for the melting point of each polymer described above are obtained from the relationship (a).

It should be noted that the weight average molecular weight and melting point of a polymer of an α-olefin having 18 or less carbon atoms have the following relationship:

$$0.0011 \times Mw + (Cn \times 3.3812 - 29.5) \leq Tm \leq 0.0011 \times Mw + ((Cn+1) \times 3.3812 - 29.5).$$

As can be seen from the above relationship (a), in the case of, for example, the polymer of an α-olefin having 20 carbon atoms, when the weight average molecular weight of the polymer is 1,000, the melting point of the polymer ranges from 40.6 to 44.0° C.; when the weight average molecular weight is 5,000, the melting point ranges from 50.6 to 54.0° C. When the melting point exceeds 54.0° C., the polymer has the same properties as those of a conventional higher α-olefin polymer, so a low viscosity characteristic of a low-molecular weight α-olefin polymer is not expressed. In addition, when the melting point is lower than 40.6° C., the molecular weight is less than 1,000, so the polymer has the same natures as those of its monomer. Accordingly, problems such as tackiness and bleedout occur.

As illustrated in FIG. 1, a straight line showing a relationship between the molecular weight and melting point of a polymer of an α-olefin having 20 or more carbon atoms has a large gradient, so molecular weight adjustment for obtaining an α-olefin polymer having a desired melting point can be easily performed.

The melting point (Tm) of the α-olefin polymer of the present invention falls within the range of about 10 to 90° C., or preferably 40 to 70° C.

(4) A stereoregularity index [$M_2$] derived from a chain of the α-olefins each having 20 to 40 carbon atoms is 20% by mol or more.

A state where the stereoregularity index [$M_2$] is 50% by mol or more means that the α-olefin polymer of the present invention has a good isotactic structure. When the stereoregularity index [$M_2$] is less than 20% by mol, the α-olefin polymer has an atactic structure or syndiotactic structure, so an increase in amorphous nature, or a reduction in crystallinity, of the α-olefin polymer occurs, and the increase or reduction leads to the deterioration of the surface property of the polymer, especially the tackiness, or a reduction in strength, of the polymer.

The stereoregularity index [$M_2$] falls within the range of preferably 20 to 90% by mol, more preferably 22 to 85% by mol, or still more preferably 25 to 75% by mol. Controlling the stereoregularity index to 20% by mol or more as described above allows one to achieve the object of the present invention.

The stereoregularity index [$M_2$] was obtained according to the method proposed in Macromolecules, 24, 2334 (1991) by T. Asakura, M. Demura, and Y. Nishiyama. Specifically, [$M_2$] can be obtained by utilizing the phenomenon in that the $CH_2$ carbon at the α-position of the side chain derived from a higher α-olefin observed in a $^{13}$C-NMR spectrum is splitted corresponding to the difference in stereoregularity. A larger value of [$M_2$] shows higher isotacticity.

The measurement of $^{13}$C-NMR can be carried out with the following apparatus under the following conditions.

Apparatus: $^{13}$C-NMR Apparatus, Model NM-EX400, manufactured by JEOL Ltd.
Measurement temperature: 130° C.
Pulse width: 45°
Accumulation number: 1,000
Solvent: mixed solvent of 1,2,4-trichlorobenzene and deuterated benzene (90 to 10 at volume ratio)

The stereoregularity index [$M_2$] is calculated in the following manner. That is six large absorption peaks derived from the mixed solvent appear at 127 to 135 ppm, and the peak value of the fourth peak from the low magnetic field side is designated as 131.1 ppm, which is used as the standard of chemical shift. The absorption peak derived from the $CH_2$ carbon at the α-position of the side chain is observed at around 34 to 37 ppm. In this case, [$M_2$] (% by mol) is obtained by the following expression.

$$[M_2] = [(\text{integrated intensity at 36.2 to 35.3 ppm})/(\text{integrated intensity at 36.2 to 34.5 ppm})] \times 100$$

The α-olefin polymer of the present invention has a limiting viscosity [η] measured in a tetralin solvent at 135° C. of preferably 0.001 to 5.0 dl/g, more preferably 0.002 to 5.0 dl/g, or still more preferably 0.01 to 3.0 dl/g. When the limiting viscosity [η] is 0.001 dl/g or more, the natures of the polymer are maintained; when the limiting viscosity is 5.0 dl/g or less, a reduction in flowability of the polymer is suppressed, so the coating property or application property of the polymer is improved.

The α-olefin polymer of the present invention has preferably 0.5 to 1.0, or more preferably 0.55 to 1.0, vinylidene group as an unsaturated terminal group per molecule. When the polymer contains 0.5 to 1.0 vinylidene group per molecule, the polymer serves as a material efficient for modification, the provision of a polar group, a crosslinking reaction, or the like.

Infrared absorption spectrometry, nuclear magnetic resonance spectrometry, a bromination method, or the like is generally employed in measuring the number of unsaturated terminal groups per molecule of the polymer described above, and the measurement can be performed by any one of the methods.

The infrared absorption spectrometry can be performed in conformity with the method described in "New Polymer Analysis Handbook, The Japan Society for Analytical Chemistry, edited by The Social Gathering for Polymer Analysis and Research."

According to the handbook, in a method of determining the number of unsaturated terminal groups per molecule of the polymer by the infrared absorption spectrometry, the number of unsaturated groups such as a vinyl group, a vinylidene group, and a trans(vinylene) group can be determined from the absorptions at 910 $cm^{-1}$, 888 $cm^{-1}$, and 963 $cm^{-1}$ of an infrared absorption spectrum, respectively.

In addition, the number of vinylidene unsaturated groups is determined by the nuclear magnetic resonance spectrometry as described below.

When the unsaturated terminal groups are vinylidene groups, the number of the unsaturated terminal groups can be determined by $^1$H-NMR measurement in accordance with an ordinary method.

The content (C) (% by mol) of vinylidene groups is calculated by an ordinary method on the basis of a vinylidene group appearing at 54.8 to 4.6 (2H) obtained from the $^1$H-NMR measurement.

Further, the number of vinylidene groups per molecule of the polymer is calculated from the number average molecular weight (Mn) of the polymer determined by gel permeation chromatography (GPC) and the monomer molecular weight (M) of the polymer from the following equation.

Number of terminal vinylidene groups per molecule (groups)=(Mn/$M$)×(C/100)

The α-olefin polymer of the present invention is useful for releasing agents for ink, paints, emulsions, and toners. In addition, the polymer is also useful for resin modifiers, components for tackiness agents, components for adhesives, components for lubricant oils, organic or inorganic composite materials, heat storage materials, modifiers for fuel oils such as a light fuel oil, modifiers for asphalt, high performance waxes, and components of cosmetics (such as lipstick, hair oil, cream, eyebrow pencil, eye shadow, brilliantine, facial mask, hair shampoo, and hair conditioner), a medical material (such as ointment, suppository, emulsion, surgical bandage, and wet compress), stationery (crayon, pastel crayon, pencil, and carbon paper), a glazing agent (for wood, furniture, leather, automobile, paper, confectionery, and fibers), a candle, cream for leather, textile oil, confectionery materials, model materials, sculpture materials, leather finishing materials, wax paper for an insulating material, a musical instrument, a printing material for a brazing material for tree grafting, a material for producing a casting mold, wax coating for fruits, various kinds of grease, ski wax, battik dyeing, a polishing agent, car wax, a metalworking oil, an anti-aging agent for rubber, a tire, an adhesive, processed paper, a heat storage agent, agrichemicals, fertilizer, an abrasive agent (for metals and stainless steel), an oily lubricant (grease, a releasing agent, and a paint), dental wax, a fixing material (for a lens and embedding), and the like.

The α-olefin polymer of the present invention can be obtained by polymerizing α-olefins having 20 to 40 carbon atoms in the presence of a polymerization catalyst containing (A) a transition metal compound represented by the following general formula (1) and (B) at least one kind of a component selected from (B-1) a compound capable of reacting with the transition metal compound as the component (A) or a derivative of the compound to form an ionic complex and (B-2) an aluminoxane.

[Chem 3]

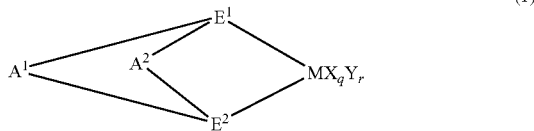

(1)

In the above general formula (1), M represents a metal element belonging to any one of Groups 3 to 10 of the periodic table, and specific examples thereof include titanium, zirconium, hafnium, yttrium, vanadium, chromium, manganese, nickel, cobalt, palladium, and lanthanide metals. Of those, titanium, zirconium, and hafnium are preferred in terms of olefin polymerization activity. In the above general formula (1), X represents a σ-bonding ligand, and specific examples thereof include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms, and an acyl group having 1 to 20 carbon atoms. q represents an integer of 1 to 5 and represents [(valence of M) −2], and in the case where q represents 2 or more, a plurality of X's may be identical to or different from each other.

Examples of the halogen atom include a chlorine atom, a fluorine atom, a bromine atom, and an iodine atom. Examples of the hydrocarbon group having 1 to 20 carbon atoms include: alkyl groups such as a methyl group, an ethyl group, a propyl group, a butyl group, a hexyl group, a cyclohexyl group, and an octyl group; alkenyl groups such as a vinyl group, a propenyl group, and a cyclohexenyl group; arylalkyl groups such as a benzyl group, a phenylethyl group, and a phenylpropyl group; and aryl groups such as a phenyl group, a tolyl group, a dimethylphenyl group, a trimethylphenyl group, an ethylphenyl group, a propylphenyl group, a biphenyl group, a naphthyl group, a methylnaphthyl group, an anthracenyl group, and a phenanthnyl group.

Examples of the alkoxy group having 1 to 20 carbon atoms include a methoxy group, an ethoxy group, a propoxy group, a butoxy group, a phenylmethoxy group, and a phenylethoxy group. Examples of the aryloxy group having 6 to 20 carbon atoms include a phenoxy group, a methylphenoxy group, and a dimethylphenoxy group.

Examples of the amide group having 1 to 20 carbon atoms include: alkyl amide groups such as a dimethyl amide group, a diethyl amide group, a dipropyl amide group, a dibutyl amide group, a dicyclohexyl amide group, and a methylethyl amide group; alkenyl amide groups such as a divinyl amide group, a dipropenyl amide group, and a dicyclohexenyl amide group; aryl alkyl amide groups such as a dibenzyl amide group, a phenylethyl amide group, and a phenylpropyl amide group; and aryl amide groups such as a diphenyl amide group and a dinaphthyl amide group.

Examples of the silicon-containing group having 1 to 20 carbon atoms include: monohydrocarbon-substituted silyl groups such as a methyl silyl group and a phenyl silyl group; dihydrocarbon-substiuted silyl groups such as a dimethyl silyl group and a diphenyl silyl group; trihydrocarbon-substituted silyl groups such as a trimethyl silyl group, a triethyl silyl group, a tripropyl silyl group, a dimethyl (t-butyl) silyl group, a tricyclohexyl silyl group, a triphenyl silyl group, a dimethylphenyl silyl group, a methyldiphenyl silyl group, a tritolyl silyl group, and a trinaphthyl silyl group; a hydrocarbon-substituted silyl ether group such as a timethyl silyl ether group; a silicon-substituted alkyl group such as a trimethyl silylmethyl group; a silicon-substituted aryl group such as a trimethyl silyl phenyl group; and a dimethylhydrosilyl group and a methyldihydrosilyl group.

Specific examples of the phosphide group having 1 to 20 carbon atoms include a dimethyl phosphide group, a methylphenyl phosphide group, a diphenyl phosphide group, a dicyclohexyl phosphide group, and a dibenzyl phosphide group.

Examples of the sulfide group having 1 to 20 carbon groups include: alkyl sulfide groups such as a methyl sulfide group, an ethyl sulfide group, a propyl sulfide group, a butyl sulfide group, a hexyl sulfide group, a cyclohexyl sulfide group, and an octyl sulfide group; alkenyl sulfide groups such as a vinyl sulfide group, a propenyl sulfide group, and a cyclohexenyl sulfide group; arylalkyl sulfide groups such as a benzyl sulfide group, a phenylethyl sulfide group, and a phenylpropyl sulfide group; and aryl sulfide groups such as a phenyl sulfide group, a tolyl sulfide group, a dimethylphenyl sulfide group, a trimethylphenyl sulfide group, an ethylphenyl sulfide group, a propylphenyl sulfide group, a biphenyl sulfide group, a naphthyl sulfide group, a methylnaphthyl sulfide group, an anthracenyl sulfide group, and a phenanthnyl sulfide group.

Examples of the acyl group having 1 to 20 carbon atoms include alkyl acyl groups such as a formyl group, an acetyl group, a propionyl group, a butyryl group, a valeryl group, a palmitoyl group, a stearoyl group, and an oleoyl group; aryl acyl groups such as a benzoyl group, a toloyl group, a salicyloyl group, a cinnamoyl group, a naphthoyl group, and a phthaloyl group; and an oxalyl group, a malonyl group, and a succinyl group each derived from dicarboxylic acids such as oxalic acid, malonic acid, and succinic acid, respectively.

In the general formula (1), Y represents a Lewis base, and specific examples thereof include amines, ethers, phosphines, and thioethers. r represents an integer of 0 to 3 and in the case where r represents 2 or 3, a plurality of Y's are identical to or different from each other.

Examples of the amine include amines each having 1 to 20 carbon atoms, and specific examples thereof include: alkyl amines such as methyl amine, ethyl amine, propyl amine, butyl amine, cyclohexyl amine, methylethyl amine, dimethyl amine, diethyl amine, dipropyl amine, dibutyl amine, dicyclohexyl amine, methylethyl amine, trimethyl amine, triethyl amine, and tri-n-butyl amine; alkenyl amines such as vinyl amine, propenyl amine, cyclohexenyl amine, divinyl amine, dipropenyl amine, and dicyclohexenyl amine; aryl alkyl amines such as phenylmethyl amine, phenylethyl amine, and phenylpropyl amine; aryl amines such as diphenyl amine and dinaphthyl amine; ammonia, aniline, N-methyl aniline, diphenyl amine, N,N-dimethyl aniline, methyldiphenyl amine, pyridine, and p-bromo-N,N-dimethyl aniline.

Specific examples of ether include: aliphatic monoether compounds such as methyl ether, ethyl ether, propyl ether, isopropyl ether, butyl ether, isobutyl ether, n-amyl ether, and isoamyl ether; aliphatic hybrid ether compounds such as methylethyl ether, methylpropyl ether, methylisopropyl ether, methyl-n-amyl ether, methylisoamyl ether, ethylpropyl ether, ethylisopropyl ether, ethylbutyl ether, ethylisobutyl ether, ethyl-n-amyl ether, and ethylisoamyl ether; aliphatic unsaturated ether compounds such as vinyl ether, allyl ether, methylvinyl ether, methylallyl ether, ethylvinyl ether, and ethylallyl ether; aromatic ether compounds such as anisole, phenetole, phenyl ether, benzyl ether, phenylbenzyl ether, α-naphthyl ether, and β-naphthyl ether; and cyclic ether compounds such as ethylene oxide, propylene oxide, trimethylene oxide, tetrahydrofuran, tetrahydropyrane, and dioxane.

As a phosphine, a phosphine having 1 to 20 carbon atoms is exemplified. Specific examples thereof include: monohydrocarbon-substituted phosphines such as methyl phosphine, ethyl phosphine, propyl phosphine, butyl phosphine, hexyl phosphine, cyclohexyl phosphine, and octyl phosphine; dihydrocarbon-substituted phosphines such as dimethyl phosphine, diethyl phosphine, dipropyl phosphine, dibutyl phosphine, dihexyl phosphine, dicyclohexyl phosphine, and dioctyl phosphine; alkyl phosphines of trihydrocarbon-substituted phosphines such as trimethyl phosphine, triethyl phosphine, tripropyl phosphine, tributyl phosphine, trihexyl phosphine, tricyclohexyl phosphine, and trioctyl phosphine; monoalkenyl phosphines such as vinyl phosphine, propenyl phosphine, and cyclohexenyl phosphine, and dialkenyl phosphines in which two hydrogen atoms of the phosphine are substituted by alkenyls; trialkenyl phosphines in which three hydrogen atoms of the phosphine are substituted by alkenyls; arylalkyl phosphines such as benzyl phosphine, phenylethyl phosphine, and phenylpropyl phosphine; diarylalkyl phosphines or aryldialkyl phosphines in which three hydrogen atoms of the phosphine are substituted by aryls or alkenyls; phenyl phosphine, tolyl phosphine, dimethylphenyl phosphine, trimethylphenyl phosphine, ethylphenyl phosphine, propylphenyl phosphine, biphenyl phosphine, naphthyl phosphine, methylnaphthyl phosphine, anthracenyl phosphine, and phenanthnyl phosphine; di(alkylaryl)phosphines in which two hydrogen atoms of the phosphine are substituted by alkylaryls; and aryl phosphines such as tri(alkylaryl)phosphines in which three hydrogen atoms of the phosphine are substituted by alkylaryls.

Specific examples of thioether include sulfides mentioned above.

In the above general formula (1), $A^1$ and $A^2$ each represent a crosslinking group, and a boron atom or a phosphorus atom serves as a crosslinking atom in at least one of $A^1$ and $A^2$. The crosslinking groups double-crosslink a substituted or unsubstituted cyclopentadienyl group and/or a substituted or unsubstituted indenyl group.

$A^1$ and $A^2$ described above each have a structure represented by, for example, the following formula (4) or (5).

[Chem 4]

(4)

(5)

In the above general formulae (4) and (5), $E^3$ and $E^4$ each represent a crosslinking atom, and examples of the atom include elements belonging to Groups 13 to 15 of the periodic table. Examples of those elements include boron, aluminum, carbon, silicon, nitrogen, and phosphorus.

$R^5$ and $R^6$ represents a carbon-containing group having 1 to 20 carbon atoms, and specific examples thereof include: alkyl groups such as a methyl group, an ethyl group, a propyl group, a butyl group, a hexyl group, a cyclohexyl group, and an octyl group; alkenyl groups such as a vinyl group, a propenyl group, and a cyclohexenyl group; arylalkyl groups such as a benzyl group, a phenylethyl group, and a phenylpropyl group; and aryl groups such as a phenyl group, a tolyl group, a dimethyl phenyl group, a trimethyl phenyl group, an ethyl phenyl group, a propyl phenyl group, a biphenyl group, a naphthyl group, a methyl naphthyl group, an anthracenyl group, and a phenanthryl group.

When $E^3$ represents boron, $R^5$ represents an electrically neutral, basic group containing nitrogen, oxygen, phosphorus, or sulfur, or a negatively charged group containing an alkyl anion, an allyl anion, or N—. The same holds true for a relationship between $E^4$ and $R^6$.

Specific examples of the electrically neutral, basic group containing nitrogen, oxygen, phosphorus, or sulfur include trimethyl amine, triethyl amine, diethyl ether, tetrahydrofuran, trimethyl phosphine, and dimethyl sulfide.

Specific examples of the negatively charged group containing an alkyl anion, an allyl anion, and N— include: alkyl groups such as a methyl group, an ethyl group, a propyl group, a butyl group, a hexyl group, a cyclohexyl group, and an octyl group; alkenyl groups such as a vinyl group, a propenyl group, and a cyclohexenyl group; aryl alkyl groups such as a benzyl group, a phenylethyl group, and a phenylpropyl group; aryl groups such as a phenyl group, a tolyl group, a dimethylphenyl group, a trimethylphenyl group, an ethylphenyl group, a propylphenyl group, a biphenyl group, a naphthyl group, a methylnaphthyl group, an anthracenyl group, and a phenanthryl group; and nitrogen-containing groups such as a dimethyl amino group, a diisopropyl amino group, and a diphenyl amino group.

In the case where $E^4$ represents phosphorus, as $R^7$, there are exemplified groups each forming a multiple bond with $E^4$, such as $=O$, $=N-R^8$, $=S$, and $=CR^8R^9$. Examples of $R^8$ and $R^9$ include: alkyl groups such as a methyl group, an ethyl group, a propyl group, a butyl group, a hexyl group, a cyclohexyl group, and an octyl group; alkenyl groups such as a vinyl group, a propenyl group, and a cyclohexenyl group; arylalkyl groups such as a benzyl group, a phenylethyl group, and a phenylpropyl group; and aryl groups such as a phenyl group, a tolyl group, a dimethylphenyl group, a trimethylphenyl group, an ethylphenyl group, a propylphenyl group, a biphenyl group, a naphthyl group, a methylnaphthyl group, an anthracenyl group, and a phenanthryl group.

In the case where $E^4$ represents phosphorus, specific examples of $R^7$ include an oxo group, a methylimino group, a phenylimino group, a trimetylsilylimino group, a thio group, $=C(CH_3)_2$, and $=CPh_2$.

Specific examples of the crosslinking group represented by the above general formula (4) or (5) and containing boron or phosphorus include B—Me, B—Ph, B—N(i-Pr)$_2$, B—CH$_3$ (NEt$_3$), P—Me, P—Ph, P(O)Ph, and P(NSiMe$_3$)Ph. Here, Ph represents a phenyl group, Me represents a methyl group, Et represents an ethyl group, Pr represents a propyl group. Hereinafter, those groups may be represented similarly.

Specific examples of the crosslinking group represented by the above general formula (4) or (5) and containing neither boron nor phosphorus include: substituted silyl groups such as dimethyl silylene, diethyl silylene, diisopropyl silylene, methylisopropyl silylene, diphenyl silylene, di(p-tolyl)silylene, methyphenyl silylene, and ethylphenyl silylene; substituted disilyl groups such as a tetramethyl disilyl group and a dimethyl diphenlyl disilyl group; and hydrocarbon groups such as isopropylidene, diphenyl methylene, methylphenyl methylene, ethylidene, methylene, ethylene, tetramethyl ethylene, cyclohexylidene, 1,2-cyclohexylene, 1,2-phenylene, vinylene, vinylidene, and ethenylidene ($CH_2=C=$)

The crosslinking group containing neither boron nor phosphorus is preferably a crosslinking group represented by the following general formula (6).

[Chem 5]

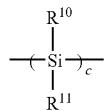

(6)

[In the formula, $R^{10}$ and $R^{11}$ each independently represent a hydrogen atom or a hydrocarbon group having 1 to 20 carbon atoms, and c represents an integer of 1 to 4.]

Here, specific examples of the hydrocarbon group having 1 to 20 carbon atoms include: alkyl groups such as a methyl group, an ethyl group, a propyl group, a butyl group, a hexyl group, a cyclohexyl group, and an octyl group; alkenyl groups such as a vinyl group, a propenyl group, and a cyclohexenyl group; arylalkyl groups such as a benzyl group, a phenylethyl group, and a phenylpropyl group; and aryl groups such a saphenyl group, a tolyl group, a dimethylphenyl group, a trimethylphenyl group, an ethylphenyl group, a propylphenyl group, a biphenyl group, a naphthyl group, a methylnaphthyl group, an anthracenyl group, and a phenanthryl group.

In the above general formula (1), $E^1$ and $E^2$ each have a structure represented by the following general formula (2) or (3). $E^1$ and $E^2$ may be different from or identical to each other.

[Chem 6]

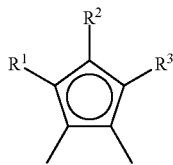

(2)

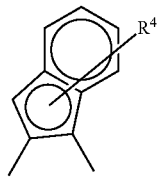

(3)

In the above general formula (2), $R^1$ to $R^3$ each independently represent a group selected from a hydrogen atom, a halogen atom, a hydrocarbon group having 1 to 20 carbon atoms, a halogen-containing hydrocarbon group having 1 to 4 carbon atoms, a silicon-containing group, and a heteroatom-containing group. In the above general formula (3), $R^4$ represents a hydrogen atom or a hydrocarbon group having 1 to 20 carbon atoms. In the above general formula (3), $R^4$ is bonded to any one of the 3- to 7-positions of an indenyl group.

Examples of the halogen atom represented by any one of $R^1$ to $R^3$ in the above general formula (2) include a chlorine atom, a fluorine atom, a bromine atom, and an iodine atom. Specific examples of the hydrocarbon group having 1 to 20 carbon atoms include examples similar to those exemplified in the above general formula (6). Specific examples of the halogen-containing hydrocarbon group having 1 to 4 carbon atoms include a chloromethyl group, a bromomethyl group, a bromoethyl group, a p-fluorophenyl group, a p-fluorophenyl methyl group, a 3,5-difluorophenyl group, a pentachlorophenyl group, a 3,4,5-trifluorophenyl group, and a pentafluorophenyl group, and a 3,5-bis(trifluoromethyl)phenyl group.

In the general formula (2), specific examples of the silicon-containing group represented by $R^1$ to $R^3$ include: monohydrocarbon-substituted silyl groups such as a methyl silyl group and a phenyl silyl group; dihydrocarbon-substituted silyl groups such as a dimethyl silyl group and a diphenyl silyl group; trihydrocarbon-substituted silyl groups such as a trimethyl silyl group, a triethyl silyl group, a tripropyl silyl group, a dimethyl(t-butyl)silyl group, a tricyclohexyl silyl group, a triphenyl silyl group, a dimethylphenyl silyl group, a methyldiphenyl silyl group, a tritolyl silyl group, and a trinaphthyl silyl group; hydrocarbon-substituted silyl ether groups such as a trimethylsilyl ether group; silicon-substituted alkyl groups such as a trimethylsilyl methyl group; silicon-substituted aryl groups such as a trimethyl silylphenyl group; and dimethylhydrosilyl groups, and methyldihydrosilyl groups.

Specific examples of the hetero atom-containing group represented by $R^1$ to $R^3$ include a diphenylphosphino group, a dimethyl boryl group, a diphenyl boryl group, and a dimethyl alcenyl group.

In the general formula (3), specific examples of the hydrocarbon group having 1 to 20 carbon atoms represented by $R^4$ include the same groups exemplified in the description of the general formula (6).

Specific examples of the transition metal compound represented by the general formula (1) include (1,1'-Me$_2$Si)(2,2'-PhP)(3-methyl-5-isopropylcyclopentadienyl)$_2$ZrCl$_2$, (1,1'-Me$_2$Si)(2,2'-(i-Pr)$_2$NB)(3,5-diisopropylcyclopentadienyl)(indenyl)ZrCl$_2$, (1,1'-Me$_2$SiSiMe$_2$)(2,2'-(i-Pr)$_2$NB)(indenyl)2ZrCl$_2$, (1,2'-MeB)(2,1'-MeB)(indenyl)$_2$ZrCl$_2$, (1,2'-PhB)(2,1'-PhB)(indenyl)$_2$ZrCl$_2$, (1,2'-MeP)(2,1'-MeP)(indenyl)$_2$ZrCl$_2$, (1,2'-PhP)(2,1'-PhP)(indenyl)$_2$ZrCl$_2$, (1,2'-(i-Pr)$_2$NB) (2,1'-(i-Pr)$_2$NB)(indenyl)$_2$ZrCl$_2$, (1,2'-MeB)(2,1'-Me$_2$Si)(indenyl)$_2$ZrCl$_2$, (1,2'-PhB)(2,1'-Me$_2$Si)(indenyl)$_2$ZrCl$_2$, (1,2'-MeP)(2,1'-Me$_2$Si)(indenyl)$_2$ZrCl$_2$, (1,2'-PhP)(2,1'-Me$_2$Si)(indenyl)$_2$ZrCl$_2$, (1,2'-(i-Pr)$_2$NB)(2,1'-Me$_2$Si)(indenyl)$_2$ZrCl$_2$, (1,2'-MeB)(2,11-MeB)(indenyl)(cyclopentadienyl)ZrCl$_2$, (1,2'-PhB)(2,1'-PhB)(indenyl)(cyclopentadienyl)ZrCl$_2$, (1,2'-MeP)(2,1'-MeP)(indenyl)(cyclopentadienyl)ZrCl$_2$, (1,2'-PhP)(2,1'-PhP)(indenyl)(cyclopentadienyl)ZrCl$_2$, (1,2'-(i-Pr)$_2$NB)(2,1'-(i-Pr)$_2$NB)(indenyl)(cyclopentadienyl)ZrCl$_2$, (1,2'-Me$_2$Si)(2,1'-MeB)(indenyl)(cyclopentadienyl)ZrCl$_2$, (1,2'-Me$_2$Si)(2,1'-PhB)(indenyl)(cyclopentadienyl)ZrCl$_2$, (1,2'-Me$_2$Si)(2,1'-MeP)(indenyl)(cyclopentadienyl)ZrCl$_2$, (1,2'-Me$_2$Si)(2,1'-PhP)(indenyl)(cyclopentadienyl)ZrCl$_2$, and (1,2'-Me$_2$Si)(2,1'-(i-Pr)$_2$NB)(indenyl)(cyclopentadienyl)ZrCl$_2$.

In the present invention, of those, (1,1'-Me$_2$Si)(2,2'-PhP)(3-methyl-5-isopropylcyclopentadienyl)$_2$ZrCl$_2$, (1,1'-Me$_2$Si)(2,2'-(i-Pr)$_2$NB)(3,5-diisopropylcyclopentadienyl)(indenyl)ZrCl$_2$, (1,1'-Me$_2$SiSiMe$_2$)(2,2'-(i-Pr)$_2$NB)(indenyl)$_2$ ZrCl$_2$, and (1,2'-PhP)(2,1'-Me$_2$Si)(indenyl)$_2$ZrCl$_2$ are preferred.

In addition, products each obtained by substituting zirconium in each of those compounds with titanium or hafnium, and analogous compounds each obtained by substituting zirconium in each of those compounds with a metal element belonging to any other group can also be used.

The transition metal compound represented by the above general formula (1) can be synthesized by the method described in, for example, "J. Organomet. Chem, vol. 369, p 359 (1989)." That is, the compound can be synthesized by a reaction between the corresponding substituted cycloalkenyl anion and a halide of the metal represented by M in the above general formula (1).

Next, any ionic compound that reacts with the transition metal compound as the component (A) to form an ionic complex can be used as the component (B-1) in the component (B); a compound represented by the following general formula (7) or (8) is particularly preferable because of, for example, its capability of efficient formation of a polymerization active site.

    (7)

    (8)

In the general formula (7), L$^1$ represents a Lewis base. Specific examples of the Lewis base include amines such as ammonia, methyl amine, aniline, dimethyl amine, diethyl amine, N-methyl aniline, diphenyl amine, N,N-dimethyl aniline, trimethyl amine, triethyl amine, tri-n-butyl amine, methyldiphenyl amine, pyridine, p-bromo-N,N-dimethyl aniline, and p-nitro-N,N-dimethyl aniline, phosphines such as triethyl phosphine, triphenyl phosphine, and diphenyl phosphine, thioethers such as tetrahydrothiophene, esters such as ethyl benzoate, nitriles such as acetonitrile and benzonitrile.

R$^{11}$ represents a hydrogen atom, an alkyl group having 1 to 20 carbon atoms, an aryl group having 6 to 20 carbon atoms, an alkylaryl group, or an arylalkyl group. Specific examples of R$^{11}$ include a hydrogen atom, a methyl group, an ethyl group, a benzyl group, and a trityl group.

In the above general formulae (7) and (8), [Z]$^-$ represents an uncoordinated anion, and examples of [Z]$^-$ include [Z$^1$]$^-$ and [Z$^2$]$^-$ described below.

[Z$^1$]$^-$ represents an anion obtained by bonding multiple groups to an element, that is, [M$^3$G$^1$G$^2$ ... G$^f$]. Here, M$^3$ represents an element belonging to any one of Groups 5 to 15 of the periodic table, or preferably an element belonging to any one of Groups 13 to 15 of the periodic table. Specific examples of M$^3$ include B, Al, Si, P, As, and Sb; and B and Al are preferable.

G$^1$ to G$^f$ each represent a hydrogen atom, a halogen atom, an alkyl group having 1 to 20 carbon atoms, a dialkyl amino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a hetero atom-containing hydrocarbon group having 2 to 20 carbon atoms. Two or more of G$^1$ to G$^f$ may form a ring. f represents an integer obtained from [(valence of central metal M$^3$)+1].

Specific examples of G$^1$ to G$^f$ include a dimethyl amino group and a diethyl amino group as dialkyl amino groups, a methoxy group, an ethoxy group, an n-butoxy group, and a phenoxy group as alkoxy groups or aryloxy groups, a methyl group, an ethyl group, an n-propyl group, an isopropyl group, an n-butyl group, an isobutyl group, an n-octyl group, a n-icosyl group, a phenyl group, a p-tolyl group, a benzyl group, a 4-t-butylphenyl group, and a 3,5-dimethylphenyl group as hydrocarbon groups, a fluorine atom, a chlorine atom, a bromine atom, and an iodine atom as halogen atoms, a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, a bis(trimethyl silyl)methyl) group as hetero atom-containing hydrocarbon groups, and a pentamethyl antimony group, a trimethyl silyl group, a trimethylgermyl group, a diphenyl arsine group, a dicyclohexyl antimony group, and a diphenyl borate group as organic metalloid groups.

[Z$^2$]$^-$ represents a conjugate base of a Bronsted acid alone, or a combination of a Bronsted acid and a Lewis acid, having a logarithm of the reciprocal of its acid dissociation constant (pKa) of –10 or less, or a conjugate base of an acid generally defined as a super acid. In addition, [Z$^2$]$^-$ may be coordinated with a Lewis base.

Specific examples of [Z$^2$]$^-$ include a trifluoromethane sulfonate anion (CF$_3$SO$_3$)$^-$, a bis(trifluoromethane sulfonyl)methyl anion, a bis(trifluoromethane sulfonyl)benzyl anion, a bis(trifluoromethane sulfonyl)amide, perchlorate anion (ClO$_4$)$^-$, a trifluoroacetate anion (CF$_3$CO$_2$)$^-$, a hexafluoroantimony anion (SbF$_6$)$^-$, a fluorosulfonate anion (FSO$_3$)$^-$, a chlorosulfonate anion (ClSO$_3$)$^-$, a fluorosulfonate anion/5-fluoroanitimony (FSO$_3$/SbF$_5$)$^-$, a fluorosulfonate anion/5-fluoroarsenic (FSO$_3$/AsF$_5$)$^-$, and a triluoromethane sulfonic acid/5-fluoroantimony (CF$_3$SO$_3$/SbF$_5$)$^-$.

In the above general formulae (7) and (8), h means the valency of each of [L$^1$-R$^{11}$] and [L$^2$] and represents an integer of 1 to 3, a represents an integer of 1 or more, and b=(h×a).

In the above general formula (8), L$^2$ represents M$^1$, R$^{12}$R$^{13}$M$^2$, R$^{14}$$_3$C, or R$^{15}$M$_2$. Here, M$^1$ contains an element belonging to any one of Groups 1 to 3, 11 to 13, and 17 of the periodic table, and M$^2$ represents an element belonging to any one of Groups 7 to 12 of the periodic table. Specific examples of M$^1$ include Li, Na, K, Ag, Cu, Br, I, and I$_3$, and specific examples of M$^2$ include Mn, Fe, Co, Ni, and Zn.

$R^{12}$ and $R^{13}$ each represent a cyclopentadienyl group, a substituted cyclopentadienyl group, an indenyl group, a substituted indenyl group, a fluorenyl group, or a substituted fluorenyl group. Specific examples of $R^{12}$ and $R^{13}$ include a cyclopentadienyl group, a methylcyclopentadienyl group, an ethylcyclopentaidenyl group, and a pentamethylcyclopentadienyl group.

$R^{14}$ represents analkyl group having 1 to 20 carbon atoms, an aryl group, an alkylaryl group, or an aryl alkyl group. Specific examples of $R^{14}$ include a phenyl group, a p-tolyl group, and a p-methoxyphenyl group. $R^{15}$ represents a macrocyclic ligand. Specific examples thereof include tetraphenyl porphine and phthalocyanine.

Compounds of component (B-1) include triethylammonium tetraphenylborate, tri-n-butylammonium tetraphenylborate, trimethylammonium tetraphenylborate, tetraethylammonium tetraphenylborate, methyl (tri-n-butyl) ammonium tetraphenylborate, benzyl(tri-n-butyl) ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium)tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butyl-ammonium tetrakis(pentafluorophenyl)borate, tetraethylammonium tetrakis(pentafluorophenyl)borate, benzyl(tri-n-butyl)ammonium tetrakis(pentafluorophenyl) borate, methyldiphenylammonium tetrakis(pentafluorophenyl)borate, triphenyl(methyl)ammonium tetrakis(pentafluorophenyl)borate, methylanilinium tetrakis (pentafluorophenyl)borate, dimethylanilinium tetrakis (pentafluorophenyl)borate, trimethylanilinium tetrakis (pentafluorophenyl)borate, Methylpyridinium tetrakis(pentafluorophenyl)borate, benzylpyridinium tetrakis(pentafluorophenyl)borate, methyl (2-cyanopyridinium)tetrakis(pentafluorophenyl)borate, benzyl(2-cyanopyridinium)tetrakis(pentafluorophenyl)borate, methyl(4-cyanopyridinium)tetrakis(pentafluorophenyl)borate, triphenylphosphonium tetrakis(pentafluorophenyl)borate, dimethylanilinium tetrakis[bis(3,5-ditrifluoromethyl) phenyl]borate, ferrocenium tetraphenylborate, silver tetraphenylborate, trityl tetraphenylborate, tetraphenylporphyrin manganese tetraphenylborate, ferrocenium tetrakis (pentafluorophenyl)borate, (1,1'-dimethylferrocenium)tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrin manganese tetrakis(pentafluorophenyl)borate, silver tetrafluoroborate, silver hexafluorophosphate, silver hexafluoroarsenate, sliver perchlorate, silver trifluoroaceate, and silver trifluoromethanesulfonate. The compounds of component (B-1) may be used alone, or two or more kinds thereof may be used in combination.

Examples of the aluminoxane as the component (B-2) in the component (B) include a chain aluminoxane represented by the following general formula (9) and a cyclic aluminoxane represented by the following general formula (10).

[Chem 7]

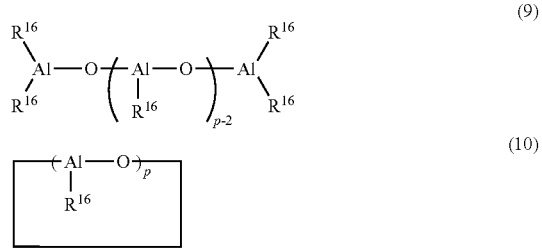

(In the formulae, $R^{16}$ represents an alkyl group having 1 to 20, or preferably 1 to 8, carbon atoms, and the respective $R^{16}$'s may be identical to or different from each other, and p means an average degree of polymerization and represents an integer of generally 2 to 50, or preferably 2 to 40.)

Specific examples of the aluminoxane represented by the above general formula (9) or (10) include methylaluminoxane, ethylaluminoxane, and isobutylaluminoxane.

A method for producing the above aluminoxanes includes a method of contacting an alkylaluminum with a condensing agent such as water, but is not particularly limited and reaction may be performed according to a known method. For example, there are methods of (1) contacting an organoaluminum compound dissolved in advance in an organic solvent with water, (2) adding an organoaluminum compound in an initial phase of polymerization, followed by addition of water, (3) reacting an organoaluminum compounds with crystal water contained in a metal salt and the like or absorbed water in inorganic or organic compounds, (4) reacting a trialkylaluminum with a tetraalkyldialuminoxane, followed by reaction with water, and the like.

Note that, the aluminoxanes may be insoluble in hydrocarbon solvents such as toluene. Those aluminoxanes may be used alone, or two or more kinds thereof may be used in combination.

In the production process of the present invention, (B-3) a Lewis acid as well as the above components (B-1) and (B-2) can be suitably used in the component (B). The Lewis acid is not particularly limited, and may be an organic compound, or may be a solid, inorganic compound. A boron compound, an aluminum compound, or the like is preferably used as the organic compound because of its capability of efficient formation of an active site.

Examples of the boron compound include triphenylboron, tris(pentafluorophenyl)boron, tris[3,5-bis(trifluoromethyl) phenyl]boron, tris [(4-fluoromethyl)phenyl]boron, trimethylboron, triethylboron, tri-n-butyl boron, tris(fluoromethyl)boron, tris(pentafluoroethyl)boron, tris(nonafluorobutyl)boron, tris(2,4,6-trifluorophenyl)boron, tris(3,5-difluoro)boron, tris [3,5-bis(trifluoromethyl)phenyl]boron, bis(pentafluorophenyl)fluoroboron, diphenylfluoroboron, bis(pentafluorophenyl)chloroboron, dimethylfluoroboron, diethylfluoroboron, di-n-butylfluoroboron, pentafluorophenyldifluoroboron, phenyldifluoroboron, pentafluorophenyldichloroboron, methyldifluoroboron, ethyldifluoroboron, and n-butyldifluoroboron.

Examples of the organoaluminum compound include bis (2,6-di-t-butyl-4-methylphenoxy)aluminum methyl and (1,1-bi-2-naphthoxy)aluminum methyl.

A magnesium compound, an aluminum compound, or the like is preferably used as the solid, inorganic compound because of its capability of efficient formation of an active site.

Magnesium chloride, diethoxymagnesium, and the like can each be used as the magnesium compound, and aluminum oxide, aluminum chloride, and the like can each be used as the aluminum compound.

One kind of those Lewis acids may be used alone, or two or more kinds of them may be used in combination.

In the production process of the present invention, (B-4) clay, a clay mineral, or an ion-exchangeable laminar compound as well as the above components (B-1) to (B-3) can be suitably used in the component (B). The clay is an aggregate of fine water-containing silicate minerals, and is a substance having the following characteristics: the clay shows plasticity when mixed and kneaded with a proper amount of water, shows rigidity when dried, and sinters when burnt at high temperatures. In addition, the clay mineral is a water-containing silicate of which the clay is mainly composed.

Each of the clay and the clay mineral may be used in the preparation of the above polymerization catalyst, and each of them may be a natural product, or may be an artificially synthesized product. Examples of the clay and the clay mineral include: a clay called bentonite because of its low montmorillonite content; a kibushi clay obtained by incorporating large amounts of other components into montmorillonite; a gairome clay; sepiolite showing a fibrous morphology; palygorskite; and allophane and imogolite each of which is amorphous or has low crystallinity.

In addition, phylosilicic acids such as phylosilicic acid and phylosilicate are exemplified. Examples of the phylosilicate include, as natural products, montmorillonite, saponite, hectorite, each of which belongs to the smectite group, illite and sericite, each of which belongs to the mica group, and mix layer minerals formed of the smectite group and the mica group, or the mica group and the vermiculite group, and as synthetic products, fluorotetrasilicic mica, laponite, and smecton.

The ion-exchangeable laminar compound is a compound having the following characteristics: the compound has such a crystal structure that planes each constituted by an ionic bond or the like are stacked so as to be parallel to each other by a weak bonding force, and ions in the structure are exchangeable. It should be noted that some of the above clay minerals are ion-exchangeable laminar compounds. Examples of the ion-exchangeable laminar compound include $\alpha$-Zr(HPO$_4$)$_2$, $\gamma$-Zr(HPO$_4$)$_2$, $\alpha$-Ti(HPO$_4$)$_2$, and $\gamma$-Ti(HPO$_4$)$_2$.

The component (B-4) has a volume average particle diameter of preferably 10 μm or less, or more preferably 3 μm or less. In addition, in general, an aggregate of particles has a particle size distribution; it is preferred that the component (B-4) have a volume average particle diameter of 10 μm or less and contain particles each having a volume particle diameter of 3.0 μm or less at a content of 10% by mass or more. It is particularly preferred that the component have a volume average particle diameter of 10 μm or less and contain particles each having a volume particle diameter of 1.5 μm or less at a content of 10% by mass or more.

The volume average particle diameter and the particle size distribution are measured by, for example, a method involving the use of an instrument for measuring the particle diameter of a particle on the basis of the permeability of the particle for laser light (CIS-1 manufactured by GALAI Production Ltd.).

The component (B-4) may be pre-treated with an organosilicon compound or an organoaluminum compound. Of the above (B-4) component, a component which adsorbs a quaternary ammonium salt (such as a quaternary alkylammonium salt, a quaternary arylammonium salt, a quaternary arylalkylammonium salt, a quaternary benzylammonium salt, and a heteroaromatic ammonium salt) or reacts with clay or the like, and has high ability of forming an interlayer compound (referred to as intercalation). For example, clay or a clay mineral is preferred, and specifically, phylosilicic acids are preferred, smectite is more preferred, and montmorillonite is still more preferred. In addition, as a synthetic product, fluorotetrasilicic mica is preferred.

A usage ratio between the components (A) and (B) in the polymerization catalyst used in the production process of the present invention is as follows: when the compound (B-1) is used in the component (B), the ratio falls within the range of preferably 10:1 to 1:100, or more preferably 2:1 to 1:10 in terms of a molar ratio. A usage ratio within the range is practical because a catalyst cost per unit mass of the polymer does not become very high.

In addition, when the compound (B-2) is used, a usage ratio between the components (A) and (B-2) falls within the range of preferably 1:1 to 1:1,000,000, or more preferably 1:10 to 1:10,000 in terms of a molar ratio. A usage ratio within the range is practical because a catalyst cost per unit mass of the polymer does not become very high.

When the compound (B-3) is used in the component (B), a usage ratio between the components (A) and (B-3) falls within the range of preferably 10:1 to 1:2,000, more preferably 5:1 to 1:1,000, or still more preferably 2:1 to 1:500 in terms of a molar ratio. A usage ratio within the range is practical because a catalyst cost per unit mass of the polymer does not become very high. Each of the components (B-1), (B-2), and (B-3) may be used alone in the catalyst component (B), or a combination of two or more kinds of them may be used in the catalyst component (B).

When the compound (B-4) is used in the component (B), a ratio between the components (A) and (B-4) is as follows: the transition metal complex as the component (A) is used in an amount ranging from about 0.1 to 1,000 μmol, or preferably 1 to 100 μmol with respect to the unit mass [g] of the clay or the like as the component (B-4).

An organoaluminum compound as a component (C) can be used in the polymerization catalyst used in the present invention in addition to the above components (A) and (B). Here, a compound represented by a general formula (11) is used as the organoaluminum compound as the component (C).

$$R^{17}{}_{v}AlX^1{}_{3-v} \tag{11}$$

(In the formula, $R^{17}$ represents an alkyl group having 1 to 10 carbon atoms, $X^1$ represents a hydrogen atom, an alkoxy group having 1 to 20 carbon atoms, an aryl group having 6 to 20 carbon atoms, or a halogen atom, and v represents an integer of 1 to 3.)

Specific examples of the compound represented by the above general formula (11) include trimethylaluminum, triethylaluminum, triisopropylaluminum, triisobutylaluminum, trioctylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride. Those organoaluminum compounds may be used alone, or two or more kinds thereof may be used in combination. Of those, trialkyl aluminums are preferred. Of trialkyl aluminums, triethyl aluminum, triisobutyl aluminum, and trioctyl aluminum are preferred.

A usage of the organoaluminum as the component (C) is in the range of preferably 1:1 to 1:10,000, more preferably 1:5 to 1:2,000, and further more preferably 1:10 to 1:1,000 in terms of a molar ratio between the components (A) and (C). Use of the component (C) improves polymerization activity per unit transition metal. When the molar ratio "(A): (C)" falls within the range of 1:1 to 1:10,000, a good balance is established between an effect of the addition of the component (C) and economical efficiency, and there is no fear of the presence of a large amount of aluminum in the target α-olefin polymer.

A product obtained by contacting the above components (A) and (B), or the above components (A), (B), and (C), and an α-olefin having 3 to 24, or preferably 3 to 18, carbon atoms in advance can be used as the polymerization catalyst used in the present invention. The use of such catalyst exerts, for example, the following effects: catalytic activity is improved, and the ratio at which the component (B) as a co-catalyst is used reduces.

Examples of α-olefins having 3 to 18 carbon atoms include propylene, 1-butene, 1-pentene, 1-octene, 1-decene, 1-tridecene, 1-tetradecene, 1-pentadecene, 1-hexadecene, 1-heptadecene, and 1-octadecene. Those α-olefins may be used alone, or two or more kinds thereof may be used in combination.

At the time of the polymerization of the α-olefin in the present invention, preliminary polymerization can be performed by using the above catalyst. The preliminary polymerization can be performed by contacting a solid catalyst component and a small amount of the α-olefin. A reaction temperature in this case falls within the range of generally about −20 to 100° C., preferably −10 to 70° C., or more preferably 0 to 50° C. In addition, a solvent to be used at the time of the preliminary polymerization is, for example, an inert hydrocarbon, an aliphatic hydrocarbon, an aromatic hydrocarbon, or a monomer; out of them, the aliphatic hydrocarbon and the aromatic hydrocarbon are preferable. Conditions for the preliminary polymerization are desirably set so that a preliminary polymerization product may be produced in an amount of 1 to 10,000 g, or preferably 10 to 1,000 g per 1 mmol of the transition metal compound as the component (A).

When the polymerization catalyst is used without the performance of the above preliminary polymerization, upon production of the α-olefin polymer of the present invention, the organoaluminum compound as the component (C) may be caused to contact the component (A) and/or the component (B) in advance, or the following procedure may be adopted: the component (C) is loaded into a reactor, and is caused to contact the components (A) and (B) by loading the components into the reactor.

One kind of an α-olefin having 20 to 40 carbon atoms as a raw material for the polymer may be used alone, or two or more kinds of such α-olefins may be used in combination. When copolymerization is performed by using two or more kinds of α-olefins, the above α-olefins can be arbitrarily combined.

A polymerization type in the process for the production of an α-olefin polymer of the present invention is not particularly limited, and any one of the polymerization methods such as a slurry polymerization method, a solution polymerization method, a vapor phase polymerization method, a bulk polymerization method, and a suspension polymerization method can be adopted. The polymerization may be performed in the absence of a solvent, or may be performed in an organic solvent. When the polymerization is performed in an organic solvent, for example, any one of the hydrocarbons and halogenated hydrocarbons such as benzene, toluene, xylene, n-hexane, n-heptane, cyclohexane, methylene chloride, chloroform, 1,2-dichloroethane, and chlorobenzene can be used as the organic solvent. One kind of those solvents may be used alone, or two or more kinds of them may be used in combination. In addition, a certain kind of a monomer to be used in the polymerization can be used as the organic solvent.

The polymerization to be performed may be of a batch type, or may be of a continuous type. The pressure at which the polymerization is performed is not particularly limited, and generally falls within the range of about atmospheric pressure to 200 MPa (Gauge). The polymerization is performed at a temperature in the range of generally about −50 to 250° C. for a time period of generally about 1 minute to 50 hours. The molecular weight of the a-olefin polymer can be adjusted by, for example, appropriately selecting the kind and usage of each catalyst component, and the polymerization temperature, and introducing hydrogen.

EXAMPLES

The present invention is now described in more detail with reference to the Examples, but is not limited thereto. Measurement of physical properties of α-olefin polymers obtained each of the Examples was performed according to the method described below.

(1) Intrinsic Viscosity [η]

Measurement was performed by using an automatic viscometer Model VMR-053 from RIGO Co., Ltd. in a tetralin solvent at 135° C.

(2) Weight Average Molecular Weight (Mw) and Molecular Weight Distribution (Mw/Mn)

Measurement was performed by the above-mentioned method.

(3) Melting Point (Tm), Melting Heat Absorption (ΔH), and Half Value Width

Measurement was performed by the above-mentioned method.

(4) Stereoregularity Index [$M_2$]

Measurement was performed by the above-mentioned method.

(5) Penetration Rate

Measurement was performed in conformity with JIS K-2235-5.4. In other words, a sample was melted by heating and collected in a sample container. After the sample had been left standing to cool, the temperature of the sample was kept at 25° C. in a thermobath, and the penetration rate of the sample was measured with an automatic penetration rate tester.

(6) Vinylidene Group Concentration and Number of Vinylidene Groups (Per Molecule)

The vinylidene group concentration of the polymer was measured by NMR. The number of vinylidene groups per molecule of the polymer was calculated from the number average molecular weight and the vinylidene group concentration.

$$\text{Number} = (\text{vinylidene group concentration mol \%})/\{(252/Mn) \times 100\}$$

Production Example 1 [synthesis of (1,1'-Me$_2$SiSiMe$_2$)(2,2'-(i-Pr)$_2$NB)(indenyl)$_2$ zirconium dichloride (formula (15))]

[Chem 8]

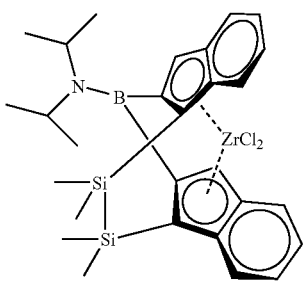

(15)

(1) Synthesis of (2-indenyl)(diisopropylamino)chloroborane 2-bromoindene was synthesized by using 2-bromo-1-indanol as a raw material. In a stream of nitrogen, 10.0 g (51.3 mmol) of 2-bromoindene and 5 g of magnesium were caused to react with each other, whereby bromomagnesium indene was obtained. 6.5 ml of trimethylchlorosilane were caused to react with the resultant, whereby 7.14 g (37.9 mmol) of 2-trimethylsilylindene as a colorless oily product were obtained.

7.14 g of 2-trimethylsilylindene obtained in the foregoing were dissolved in 20 ml of dichloromethane. 38.0 ml of a solution (1.0 mol/L) of boron trichloride in dichloromethane were added to the solution at 0° C., and the mixture was stirred at room temperature for 3 hours. The solvent was removed, whereby 7.1 g (36.1 mmol) of (2-indenyl)dichloroborane as a pale yellow solid were obtained.

The solid was dissolved in 50 ml of hexane. A solution prepared by dissolving 10.1 ml (72.2 mmol) of diisopropylamine in 10 ml of hexane was added dropwise to the solution at 0° C.

After the completion of the dropwise addition, the mixture was refluxed under heat for 2 hours, and the precipitate was separated by filtration. The solvent of the filtrate was removed by distillation under reduced pressure, and the resultant oily product was distilled under reduced pressure (140° C./12 kPa), whereby 6.42 g (24.5 mmol) of (2-indenyl)(diisopropylamino)chloroborane as a colorless solid were obtained.

The $^1$H-NMR (CDCl$_3$) spectrum of the compound was as follows: −0.50 (s, 3H), 0.50 (s, 3H), 1.04 (d, 6H), 1.30 (d, 6H), 2.33 (s, 6H), 2.82 (m, 2H), 6.28 (2H), and 7.28 to 7.67 (m, 5H).

(2) Synthesis of (1,1'-Me$_2$SiSiMe$_2$)(2,2'-(i-Pr)$_2$NB) bis(indene)

In a stream of nitrogen, 3.1 g (15.9 mmol) of 2-bromoindene and 1.6 g of magnesium were caused to react with each other in 50 ml of tetrahydrofuran, whereby a reaction solution containing bromomagnesium indene was obtained. The reaction solution was added dropwise to a solution prepared by dissolving 4.11 g (15.7 mmol) of (2-indenyl)(diisopropylamino)chloroborane synthesized in the above section (1) in 30 ml of tetrahydrofuran at 0° C. After the mixture had been stirred at room temperature for 4 hours, the solvent was removed by distillation, and the remainder was extracted twice with 40 ml of hexane and 10 ml of dichloromethane, whereby 6.47 g (19.0 mmol) of bis(2-indenyl)(diisopropylamino)borane as a pale yellow solid were obtained.

3.3 ml (23.5 mmol) of diisopropylamine and 14.8 ml of a solution (1.58 mol/L) of n-butyllithium in hexane were caused to react with each other in 50 ml of tetrahydrofuran, whereby lithium diisopropylamide was obtained.

4.0 g (11.7 mmol) of bis(2-indenyl)(diisopropylamino)borane were dissolved in 30 ml of tetrahydrofuran, and lithium diisopropylamide described above was added dropwise to the solution at 0° C.

After the completion of the dropwise addition, the mixture was stirred at room temperature for 2 hours, whereby a dark green solution was obtained. After 2.0 ml of tetramethyldichlorodisilane had been added dropwise to the solution at −78° C., the mixture was stirred at room temperature for 2 hours. The solvent was removed by distillation, and the remainder was extracted twice with 30 ml of hexane. Hexane was removed by distillation under reduced pressure, whereby 2.61 g (5.7 mmol) of (1,1'-Me$_2$SiSiMe$_2$)(2,2'-(i-Pr)$_2$NB)bis(indene) as a white solid were obtained.

(3) Synthesis of (1,1'-Me$_2$SiSiMe$_2$)(2,2'-(i-Pr)$_2$NB) bis(indenyl)zirconium dichloride 1.4 g (3.1 mmol) of (1,1'-Me$_2$SiSiMe$_2$)(2,2'-(i-Pr)$_2$NB)bis(indene) obtained in the above section (2) were dissolved in 30 ml of ether. 3.9 ml of a solution (1.58 mol/L) of n-butyllithium in hexane were added dropwise to the solution at −78° C., and the mixture was stirred at room temperature for 8 hours. The solvent was removed by distillation under reduced pressure, and then the resultant solid was washed with 30 ml of hexane, whereby a dilithio salt as a pale orange solid was obtained.

The salt was suspended in 20 ml of toluene, and a separately prepared suspension of 0.72 g (3.1 mmol) of zirconium tetrachloride in 10 ml of toluene was added dropwise to the suspension at 0° C. The mixture was stirred at room temperature overnight, and the precipitate portion was separated by filtration. The solvent was concentrated by half, and 5 ml of hexane were added to the resultant, whereby 0.29 g of (1,1'-Me$_2$SiSiMe$_2$)(2,2'-(i-Pr)$_2$NB)bis(indenyl) zirconium dichloride as a yellow powder was obtained.

Production Example 2

Preparation of Preliminary Polymerization Catalyst

The zirconium complex obtained in Production Example 1, dimethylanilinium borate, triisobutylaluminum, and 1-octadecene (trade name Linearene 18 manufactured by Idemitsu Kosan Co., Ltd.) were mixed in toluene, and the mixture was stirred at room temperature for 12 hours, whereby a preliminary polymerization catalyst solution was obtained.

Example 1

200 ml of an α-olefin having 20 carbon atoms, 0.5 mmol of triisobutylaluminum, 1 µmol of (1,1'-Me$_2$SiSiMe$_2$)(2,2'-(i-Pr)$_2$NB)bis(indenyl)zirconium dichloride synthesized in Production Example 1, and 4 µmol of dimethylanilinium tetrakis(pentafluorophenyl)borate were added to a 1-L autoclave dried with heat. Further, 0.8 MPa of hydrogen was introduced into the autoclave, and the mixture was polymerized at a polymerization temperature of 140° C. for 240 minutes. After the completion of the polymerization reaction, the reaction product was precipitated with acetone, and was then subjected to a drying treatment under heat and reduced pressure, whereby 135 g of a higher α-olefin polymer were obtained.

The physical properties of the resultant higher α-olefin polymer were measured by the above methods. Table 1 shows the results.

Example 2

200 ml of an α-olefin having 20 carbon atoms, 0.5 mmol of triisobutylaluminum, and 2 μmol of the preliminary polymerization catalyst solution prepared in Production Example 2 were added to a 1-L autoclave dried with heat. Further, 0.2 MPa of hydrogen was introduced into the autoclave, and the mixture was polymerized at a polymerization temperature of 80° C. for 240 minutes. After the completion of the polymerization reaction, the reaction product was precipitated with acetone, and was then subjected to a drying treatment under heat and reduced pressure, whereby 130 g of a higher α-olefin polymer were obtained.

The physical properties of the resultant higher α-olefin polymer were measured by the above methods. Table 1 shows the results.

Example 3

200 ml of α-olefins as a mixture of an α-olefin having 22 carbon atoms and an α-olefin having 24 carbon atoms (22 carbon atoms: 64% by mass, 24 carbon atoms: 36% by mass), 0.5 mmol of triisobutylaluminum, 1 μmol of (1,1'-Me$_2$SiSiMe$_2$)(2,2'-(i-Pr)$_2$NB)bis(indenyl)zirconium dichloride synthesized in Production Example 1, and 4 μmol of dimethylanilinium tetrakis(pentafluorophenyl)borate were added to a 1-L autoclave dried with heat. Further, 0.8 MPa of hydrogen was introduced into the autoclave, and the mixture was polymerized at a polymerization temperature of 130° C. for 240 minutes. After the completion of the polymerization reaction, the reaction product was precipitated with acetone, and was then subjected to a drying treatment under heat and reduced pressure, whereby 120 g of a higher α-olefin polymer were obtained.

The physical properties of the resultant higher α-olefin polymer were measured by the above methods. Table 1 shows the results.

Example 4

200 ml of a mixture of an α-olefin having 26 carbon atoms and an α-olefin having 28 carbon atoms (C26: 56.9% by mass, C28: 39.4% by mass), 0.5 mmol of triisobutylaluminum, 1 μmol of (1,1'-Me$_2$SiSiMe$_2$)(2,2'-(i-Pr)$_2$NB)bis(indenyl)zirconium dichloride synthesized in Production Example 1, and 4 μmol of dimethylanilinium tetrakis(pentafluorophenyl)borate were added to a 1-L autoclave dried with heat. Further, 0.2 MPa of hydrogen was introduced into the autoclave, and the mixture was polymerized at a polymerization temperature of 80° C. for 240 minutes. After the completion of the polymerization reaction, the reaction product was pre-cipitated with acetone, and was then subjected to a drying treatment under heat and reduced pressure, whereby 112 g of a higher α-olefin polymer were obtained.

The physical properties of the resultant higher α-olefin polymer were measured by the above methods. Table 1 shows the results.

Example 5

200 ml of a mixture of an α-olefin having 26 carbon atoms and an α-olefin having 28 carbon atoms (C26: 56.9% by mass, C28: 39.4% by mass), 0.5 mmol of triisobutylaluminum, 1 μmol of (1,1'-Me$_2$SiSiMe$_2$)(2,2'-(i-Pr)$_2$NB)bis(indenyl)zirconium dichloride synthesized in Production Example 1, and 4 μmol of dimethylanilinium tetrakis(pentafluorophenyl)borate were added to a 1-L autoclave dried with heat. Further, 0.8 MPa of hydrogen was introduced into the autoclave, and the mixture was polymerized at a polymerization temperature of 120° C. for 240 minutes. After the completion of the polymerization reaction, the reaction product was precipitated with acetone, and was then subjected to a drying treatment under heat and reduced pressure, whereby 105 g of a higher α-olefin polymer were obtained.

The physical properties of the resultant higher α-olefin polymer were measured by the above methods. Table 1 shows the results.

Comparative Example 1

The physical properties of a paraffin wax (trade name 150 manufactured by NIPPON SEIRO CO., LTD) were measured by the above methods. The stereoregularity index ([M$_2$]) could not be measured. Table 1 shows the results.

Comparative Example 2

The physical properties of a polyolefin synthetic wax (trade name Viper 103 manufactured by Toyo Petrolite Co. Ltd.) were measured by the above methods. The stereoregularity index ([M$_2$]) could not be measured. Table 1 shows the results.

Comparative Example 3

200 ml of an α-olefin having 20 carbon atoms, 0.5 mmol of triisobutylaluminum, 1 μmol of dimethylsilylenebis(2-methylbenzindenyl)zirconium dichloride synthesized in accordance with JP 06-345809 A, and 4 μmol of dimethylanilinium tetrakis(pentafluorophenyl)borate were added to a 1-L autoclave dried with heat. Further, 0.2 MPa of hydrogen was introduced into the autoclave, and the mixture was polymerized at a polymerization temperature of 80° C. for 240 minutes. After the completion of the polymerization reaction, the reaction product was precipitated with acetone, and was then subjected to a drying treatment under heat and reduced pressure, whereby 70 g of a higher α-olefin polymer were obtained.

The physical properties of the resultant higher α-olefin polymer were measured by the above methods. Table 1 shows the results.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Average number of carbon atoms | 20 | 20 | 23 | 26 | 26 | — | — | 20 |
| [η] (dl/g) | 0.029 | 0.032 | 0.031 | 0.032 | 0.031 | 0.023 | 0.112 | 0.061 |

TABLE 1-continued

|  | Example | | | | | Comparative Example | | |
| --- | --- | --- | --- | --- | --- | --- | --- | --- |
|  | 1 | 2 | 3 | 4 | 5 | 1 | 2 | 3 |
| Mw | 2,400 | 5,000 | 2,800 | 4,600 | 2,700 | 1,500 | 29,800 | 15,000 |
| Mw/Mn | 1.18 | 1.30 | 1.24 | 1.85 | 1.35 | 1.05 | 4.60 | 1.52 |
| Tm (° C.) | 47.2 | 53.5 | 55.3 | 71.8 | 67.9 | 67.8 | 62.9 | 59.6 |
|  |  |  |  |  |  |  |  | 64.2 |
| ΔH (J/g) | 134.0 | 114.6 | 138.2 | 142.0 | 153.6 | 199.3 | 104.3 | 107.0 |
| Half value width (° C.) | 7 | 5 | 9 | 6 | 9 | 12 | 24 | 15 |
| [$M_2$] (% by mol) | 31.9 | 34.3 | 32.8 | 30.1 | 25.1 | — | — | 80.9 |
| Penetration rate (mm) | 2 | 2 | 2 | 7 | 7 | 13 | 5 | 2 |
| 0.0025 × Mw + (Cn × 3.3812 − 29.55) | 44.1 | 50.6 | 55.3 | 69.9 | 65.2 | — | — | 38.1 |
| 0.0025 × Mw + ((Cn + 1) × 3.3812 − 29.5) | 47.5 | 54.0 | 58.6 | 73.3 | 68.5 | — | — | 41.5 |
| Vinylidene group concentration (% by mol) | 8.1 | 4.6 | 4.6 | 5.5 | 12.0 | — | — | 0.1 |
| Number of vinylidene groups per molecule | 0.6 | 0.63 | 0.7 | 0.55 | 0.95 | — | — | 0.2 |

As can be seen from the table, the α-olefin polymer of each of the examples has sharp melting property and is excellent in flowability or the like as compared to a commercially available wax having a molecular weight and a melting point comparable to those of the α-olefin polymer.

[Derivation of Relationship (a)]

The following relationship (a) is calculated as described below.

$$0.0025 \times Mw + (Cn \times 3.3812 - 29.5) \leq Tm \leq 0.0025 \times Mw + ((Cn+1) \times 3.3812 - 29.5) \quad (a)$$

The results of the measurement of Examples 1 and 2 (20 carbon atoms), and Examples 4 and 5 (26 carbon atoms) are plotted on an x-y plane whose x-axis and y-axis indicate [Mw] and [Tm], respectively. Then, the gradient and intercept of each resultant straight line are determined.

20 carbon atoms: $[Tm] = 0.0025 \times [Mw] + 41.108$ 26 carbon atoms: $[Tm] = 0.0026 \times [Mw] + 61.395$ As a result of comparison with experimental results for any other number of carbon atoms, 0.0025 is regarded as an optimum value for the gradient, and is used in the relationship (a).

Meanwhile, the use of the intercept in each of the above equations (melting point at Mw=0: referred to as "lowest melting point") enables the generalization of a relationship between a number of carbon atoms of 20 or more and the lowest melting point as described below.

(Lowest melting point) = $3.3812 \times [Cn] - 29.5$

Combining the gradient (0.0025) previously obtained and the generalized lowest melting point yields the following equation:

$$0.0025 \times Mw + (Cn \times 3.3812 - 29.5).$$

As a result, the relationship (a) is obtained by defining the range of Cn to Cn+1 as a range where the α-olefin polymer of the present invention is expected to exert its effect.

INDUSTRIAL APPLICABILITY

In addition, a high hardness is characteristic of the polymer. Accordingly, the polymer is useful in various applications typified by releasing agents for ink, paints, emulsions, and toners.

The invention claimed is:

1. An α-olefin polymer of one or more kinds of α-olefins each having 20 to 40 carbon atoms, wherein the polymer meets the following requirements (1) to (4):

(1) the a-olefin polymer has a molecular weight distribution (Mw/Mn) determined from its weight average molecular weight (Mw) and number average molecular weight (Mn) in terms of polystyrene measured by gel permeation chromatography (GPC) of 2 or less, and has a weight average molecular weight (Mw) of 5,000 or less;

(2) measurement of a melting point (Tm) of the α-olefin polymer with a differential scanning calorimeter (DSC) shows one melting peak, a melting heat absorption (ΔH) calculated from an area of the melting peak is 20 J/g or more, and the melting peak has a half value width of 10° C. or less;

(3) when the weight average molecular weight (Mw) falls within a range of 1,000 to 5,000 and an average number of carbon atoms (Cn) of the α-olefins falls within a range of 20 to 40, the weight average molecular weight (Mw), the average number of carbon atoms (Cn), and the melting point (Tm) measured with the differential scanning calorimeter (DSC) satisfy the following relationship (a):

$$0.0025 \times Mw + (Cn \times 3.3812 - 29.5) \leq Tm \leq 0.0025 \times Mw + ((Cn+1) \times 3.3812 - 29.5) \quad (a);$$

and (4) a stereoregularity index [$M_2$] derived from a chain of the α-olefins each having 20 to 40 carbon atoms is 20% by mol or more.

2. The α-olefin polymer according to claim 1, wherein the α-olefin polymer meets the following requirement (5):

(5) the α-olefin polymer has 0.5 to 1.0 vinylidene group as an unsaturated terminal group per molecule.

3. A process for production of the α-olefin polymer according to claim 1, comprising polymerizing α-olefins having 20 to 40 carbon atoms in the presence of a polymerization catalyst containing (A) a transition metal compound represented by the following general formula (1) and (B) at least one kind of a component selected from (B-1) a compound capable of reacting with the transition metal compound as the component (A) or a derivative of the compound to form an ionic complex and (B-2) an aluminoxane:

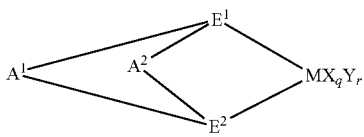
(1)

where M represents a metal element belonging to any one of Groups 3 to 10 of the periodic table, X represents a σ-bonding ligand, and, when multiple X's are present, the multiple X's may be identical to or different from each other, Y represents a Lewis base, and, when multiple Y's are present, the multiple Y's may be identical to or different from each other, $A^1$ and $A^2$ each represent a crosslinking group, and a boron atom or a phosphorus atom serves as a crosslinking atom in at least one of $A^1$ and $A^2$, q represents an integer of 1 to 5 and corresponds to [(valence of M)-2], r represents an integer of 0 to 3, and $E^1$ and $E^2$ each have a structure represented by the following general formula (2) or (3):

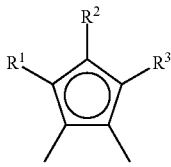
(2)

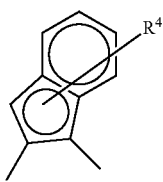
(3)

where $R^1$ to $R^3$ each independently represent a group selected from a hydrogen atom, a halogen atom, a hydrocarbon group having 1 to 20 carbon atoms, a halogen-containing hydrocarbon group having 1 to 4 carbon atoms, a silicon-containing group, and a heteroatom-containing group, and $R^4$ represents a hydrogen atom or a hydrocarbon group having 1 to 20 carbon atoms, and $E^1$ and $E^2$ may be different from or identical to each other.

4. The process for production of an α-olefin polymer according to claim 3, wherein the polymerization catalyst contains (C) an organoaluminum compound.

5. The process for production of an α-olefin according to claim 3, wherein the polymerization catalyst is obtained by contacting the component (A), the component (B), and an α-olefin having 3 to 24 carbon atoms in advance.

6. The process for production of an α-olefin according to claim 4, wherein the polymerization catalyst is obtained by contacting the component (A), the component (B), the component (C), and an α-olefin having 3 to 24 carbon atoms in advance.

7. A releasing agent comprising the α-olefin polymer according to claim 1 or 2 wherein the releasing agent is for ink, paint, emulsion, or toner.

8. A product comprising the releasing agent according to claim 7 wherein the product is selected from a group consisting of ink, paint, emulsion, and toner.

\* \* \* \* \*